United States Patent Office

2,887,504
Patented May 19, 1959

2,887,504

DIALKYL ESTERS OF SULFODICARBOXYLIC ACIDS

Joseph J. Carnes, Stamford, and Emil A. Vitalis, Springdale, Conn., assignors to American Cyanamid Company, New York, N.Y., a corporation of Maine No Drawing. Application September 19, 1956
Serial No. 610,727

2 Claims. (Cl. 260—481)

This invention is based on the discovery of novel bis-esters of sulfosuccinic acid having unusually good detergent properties and also excellent emulsifying properties, particularly in the preparation of oil-in-water emulsions. The invention includes the new esters themselves, their methods of preparation, and detergent and emulsifying compositions containing them.

The diesters of sulfosuccinic acid, as a class, are well known, being described in U. S. Patent No. 2,028,091, dated January 14, 1936. Several of the esters described in this patent, and particularly the diamyl, dihexyl and di-2-ethylhexyl esters, are in wide commercial use as wetting agents for increasing the speed with which textiles and other materials are wetted by water. Some of the higher dialkyl sulfosuccinates, including the 2-ethylhexyl esters, the n-decyl ester and the 1-methyl-4-ethyloctyl ester, are known to possess fairly good detergency, although not as good as some of the more powerful alkyl-aryl sulfonate detergents now on the market. Our present invention is based on the discovery of a class of diesters or bis-esters of sulfosuccinic acid possessing much greater detergency than any of the esters of this class so far developed, and which are also powerful emulsifying agents. The new compounds which we have discovered are the alkali metal salts of bis-esters of sulfosuccinic acid with dodecylcarbinol mixtures having a particular A.S.T.M. boiling range and composed of tridecanols having a highly branched molecular structure corresponding to that found in a propylene tetramer.

It is well known that propylene polymers are produced commercially by contacting a hydrocarbon gas mixture containing propylene with a polymerization catalyst such as sulfuric acid, phosphoric acid and the like. The mechanism of the polymerization reaction and the highly branched chain nature of the polymers obtained are described, for example, in "The Chemistry of Petroleum Derivatives" by Carleton Ellis (1934 edition), pages 590–592 and 598–599. The formation of a propylene tetramer by this procedure and the structure of the product obtained are as follows:

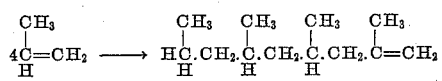

It will be understood that the commercial propylene gases usually contain other olefins, including particularly butylenes, and therefore a reaction product containing a polymer mixture is formed. Mixtures of this type are converted into the corresponding alcohols having an additional carbon atom by the Oxo process by reaction with a mixture of equal volumes of carbon monoxide and hydrogen, e.g., water gas, in a carbonylation reaction. This reaction takes place in the presence of an active carbonylation catalyst, such as a cobalt salt of a fatty acid such as oleic acid, stearic acid or palmitic acid or naphthenic acid, under suitable conditions of temperature and pressure. Temperatures within the range of from about 150° F. to about 450° F. and pressures of from about 1500 to about 4500 p.s.i.g. are usually employed. The reaction converts the olefin polymers, including propylene tetramers, into a mixture containing the corresponding aldehydes having one more carbon atom per molecule along with other oxygen containing compounds. The mixture is then hydrogenated in the presence of an active nickel catalyst, at substantially the same temperatures and pressures, to form a product in which most of the aldehydes have been converted into the corresponding alcohols.

In the specific case of the preparation of tridecyl alcohol the original propylene feed is initially polymerized to a mixture containing tetrapropylene which is then converted to an intermediate reaction mixture containing tridecyl aldehydes by the reaction with carbon monoxide and hydrogen, and then finally hydrogenated into the corresponding dodecyl carbinols or primary tridecyl alcohols. In the alcohols obtained by this process the carbinol groups are located at or adjacent to terminal carbon atoms of the highly branched carbon chains. The tridecanols obtained therefore have a structure corresponding to the formula

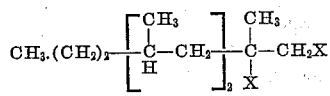

in which one X is hydrogen and the other is the carbinol radical —CH$_2$OH.

The dialkyl sulfosuccinates which constitute the subject matter of our invention are those obtained by preparing the sulfosuccinic acid diesters of a particular fraction of the primary alcohols produced by the above-described process. It will be understood that the mixtures obtained from the hydrogenation reaction are subjected to fractional distillation and various cuts are taken in order to separate the desired alcohols from each other and from the alcohol-aldehyde mixtures, bottom fractions, etc. More specific details of such fractionating processes may be found in U.S. Patents Nos. 2,415,102 and 2,594,341. The alcohols used in preparing the new esters of our invention are obtained from this fractionation as a specific distillation cut having an A.S.T.M. boiling range of from about 240° C. to about 265° C. at atmospheric pressure, and a hydroxyl number of about 230 which corresponds to a molecular weight of about 200. The alcohols in this cut are substantially all dodecylcarbinols, or primary tridecanols, in which the carbinol groups are located at or adjacent to terminal carbon atoms, as described above.

In accordance with the process of our invention this alcohol mixture is esterified with maleic or fumaric acid or with maleic anhydride and is thereby converted into bis-tridecylmaleate. The esterification may be carried out, for example, by refluxing 2 mols of the tridecyl alcohols, plus a small excess, with one mol of maleic anhydride in the presence of a small amount of an esterification catalyst such as sulfuric acid, p-toluene sulfonic acid and the like, preferably in the presence of a volatile hydrocarbon such as benzene or toluene capable of removing water as an azeotrope. The resulting bis-ester, after removing volatiles and catalyst if desired, is then sulfonated by reaction with an alkali metal or ammonium bisulfite or metabisulfite while dissolved in a solvent such as aqueous ethanol. After filtration and evaporation of solvent the final product is obtained as the alkali metal or ammonium salt of the desired bis-ester of sulfosuccinic acid, which is a plastic mass. The sodium salt, for example, when purified, has the following physical properties:

Appearance _____ White, waxy pellets.
Molecular weight (theory) _ 584.
Softening point _____ <70° C.
Melting point _____ 70°–75° C.
Density _____ 1.0 g./cc. at 25° C.
Solubility (H$_2$O) _____ <0.5 g./100 cc. at 25°C.

A solubility of greater than 100 grams/100 cc. at 25° C. was determined for acetone, chloroform, dioxane, ethanol, ethyl acetate, heptane, xylene and methylcyclohexane. The compound was dispersible in water at concentrations greater than 0.5% by heating the mixture to boiling followed by cooling. The resulting dispersions were moderately stable. The sodium salt of this bis-tridecyl ester of sulfosuccinic acid was found to possess excellent dispersing, detergent, penetrating, emulsifying and similar properties.

The detergency of this product was evaluated, along with other dialkyl sulfosuccinates, with the aid of a "standard soil" having the following composition:

| | Grams |
|---|---|
| Carbon black | 0.75 |
| White mineral oil | 3.00 |
| Lard | 3.00 |
| Carbon tetrachloride to make three liters | |

Cotton cloth was passed through this solution and held vertically, allowing the excess liquor to drain. During this period the fabric was inverted several times to insure uniform distribution of the soil while the solvent evaporated and the fabric was then air dried at room temperature. The impregnation and drying were repeated several times after which the fabric was cut into squares and reflectance measurements were taken at 600 millimicrons on a G.E. recording spectrophotometer.

In non-polar solvents, such as used in the dry cleaning industry, the branched chain bis-esters of the sulfodicarboxylic acids, as typified by tridecyl sodium sulfosuccinate, possess superior qualities. When it is desirable to disperse an organic or inorganic solid in mineral oils, or other hydrocarbons, or aqueous solvents, tridecyl sodium sulfosuccinate is eminently suited for such purposes. Furthermore, previously used sulfosuccinates having 12 or more carbon atoms in the alkyl radical are insoluble waxes and are barely dispersible in water. The highly branched bis-esters of the present invention, however, are sufficiently water-soluble and dispersible in water for many industrial applications. The sulfosuccinates of the present invention are relatively unreactive and are quite stable thermally, losing none of their valuable properties at temperatures greater than 100° C.

These bis-alkyl sulfosuccinates also possess improved water solubility and superior solvent and oil solubility characteristics as compared to other sulfosuccinate bis-esters having the same number of carbon atoms so as to render them normally acceptable for an increased number of uses for surface active agents. Moreover, when it is desired that they possess superior water-solubility characteristics, they may be mixed with the alkali metal salts of benzoic acid, such as sodium, potassium, or ammonium benzoate whereby they are transformed into hard brittle materials that are readily powdered after drying.

The alkali metal benzoates are effective for this purpose, even when used in relatively small amounts, such as, for example, the addition of as little as 5–10 parts by weight of sodium benzoate to 90–95 parts of sodium bis-tridecyl sulfosuccinate transformed the normally waxy solid into a non-sticky solid that could be dissolved in water in less than five minutes.

Detergency tests were run at 0.25 gram per 100 cc. concentration of the sodium bis-tridecylsulfosuccinate in the Launderometer according to A.A.T.C.C. procedure. Into each pint jar were placed twenty ¼" glass beads, 200 ml. of the detergent solution under test, and one numbered soiled square of fabric. The jars were rotated at 42 r.p.m. in the machine at 135° F. for 20 minutes and this was repeated for a total of three times using fresh detergent solution for each wash. The third wash was followed by three 5-minute rinses. The cloth pieces were then squeezed, ironed dry and again measured for reflectance in the spectrophotometer. The percent of return of the cloth to its original reflectance, prior to application of the soil, is the measure of detergency. Tests under the same conditions, including concentration, were made with sodium bis-2-ethylhexyl sulfosuccinate (Aerosol OT) and with a number of other comparable bis-esters of sulfosuccinic acid in the form of their sodium salts. In the following table, for convenience, the esters are identified simply by naming the alcohol used, but in all cases the bis-dialkyl sodium sulfosuccinate of this alcohol was employed. The test results were as follows:

DETERGENCY ON COTTON AT 135° F.

| Alkyl Radical | Concentration, grams/100 cc. | Percent Return to Original Reflectance |
|---|---|---|
| 2-ethyl hexyl | 0.25 | 27 |
| n-nonyl | 0.25 | 28 |
| n-decyl | 0.25 | 29 |
| 1-methyl 4-ethyl octyl | 0.25 | 29 |
| n-lauryl | 0.25 | 11 |
| tridecyl (product of Ex. 1) | 0.25 | 55 |
| n-tetradecyl | 0.25 | 7 |
| n-hexadecyl | 0.25 | 9 |
| n-octadecyl | 0.25 | 8 |

The alkali metal benzoate may be present in amounts up to 50%, based on the weight of the bis-alkyl ester of the sulfosuccinic acid. For the purposes of the present invention, however, the percentages by weight, as based on the weight of the sulfosuccinate present, of the alkali metal benzoate are preferably not greater than 50% or thus fall within the range of 5–50% by weight.

The invention will be further described in greater detail by the following specific examples.

*Example 1*

840 grams (4.20 moles) of a highly branched tridecyl alcohol (5% excess) having a boiling point of approximately 241°–265° C. and 200.8 equivalent weight from hydroxyl number and 196 grams (2.00 moles) of maleic anhydride were refluxed in the presence of 6 grams of p-toluene sulfonic acid as a catalyst and 1020 ml. of toluene as solvent. Other catalysts found suitable include: sulfuric acid, phosphoric acid, and β-naphthalenesulfonic acid. The reaction temperature range was maintained between 107° C. and 124° C. and the time of reaction was approximately 3.3 hours. Water was removed in a trap until the reaction was complete. The ester was washed with dilute sodium hydroxide and then with water to remove catalyst and unreacted maleic anhydride. The ester was stripped of toluene and unreacted alcohol by heating to about 190° C. under vacuum. 947 grams of a yellow oil comprising bis-tridecyl maleate was obtained which corresponded to a 97.6% yield.

680 grams (1.145 moles) of the highly branched bis-tridecyl maleate was then reacted with 5–10% excess of sodium bisulfite which was added as 146 grams (0.75 mole) of 94.0–98.5% sodium metabisulfite in 1000 ml. ethanol and 400 ml. water. The temperature of reflux was maintained at approximately 82°–83° C. and the time of reaction was approximately 18 hours. The excess bisulfite was oxidized with hydrogen peroxide; the reaction mixture was then diluted with ethanol; a filter aid was added, and the solution was filtered. On evaporation and drying of the filtrate at 105°–110° C., there was obtained 832 grams of a yellowish, plastic mass comprising the sodium salt of bis-tridecyl ester of sulfosuccinic acid which corresponded to a 99.5% yield.

*Example 2*

359 grams (1.76 moles) of tridecyl alcohol (5% excess) prepared by the Oxo process and having a boiling point of 177°–206° C. at 100 mm. and a 204 equivalent weight from hydroxyl number, was reacted with 82 grams (0.84 mole) of maleic anhydride in the presence of 0.5 gram concentrated H₂SO₄ as catalyst while passing carbon dioxide (or nitrogen) through the mixture. The reaction temperature was 155°–160° C. and the reaction time was 2.25 hours. The reaction mixture was neutralized with N/10 sodium hydroxide and washed with water and then steam stripped up to 150° C. with a rapid flow of steam. The ester was dried by blowing with carbon dioxide (or nitrogen) at 150° C. 428 grams of bis-tridecyl maleate was obtained in the form of a colorless oil, which represented a 90% yield. 285 grams (0.788 mole) of the bis-tridecyl maleate was then reacted with 5–10% excess of sodium bisulfite added as 81 grams (0.42 mole) of 94.0–98.5% sodium metabisulfite in the presence of 500 ml. ethanol and 250 ml. water. The temperature of reflux was approximately 81°–83° C. and the time of reflux was 11.5 hours. 423 grams of a soft, white wax comprising the sodium salt of bis-tridecyl ester of sulfosuccinic acid was obtained after drying at 100°–105° C. This represented a 96.7% yield.

This is a continuation-in-part of our copending application Serial No. 311,156, filed September 23, 1952, now abandoned.

What we claim is:

1. An alkali metal salt of a bis-ester of sulfosuccinic acid with a mixture of dodecylcarbinols having an A.S.T.M. boiling range of from 240° C. to 265° C. at atmospheric pressure, a hydroxyl number of about 230 and a structure corresponding to the formula

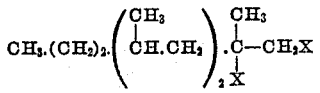

in which one X is hydrogen and the other is the carbinol radical.

2. The sodium salt of a bis-ester of sulfosuccinic acid with a mixture of dodecylcarbinols having an A.S.T.M. boiling range of from 240° C. to 265° C. at atmospheric pressure, a hydroxyl number of about 230 and a structure corresponding to the formula

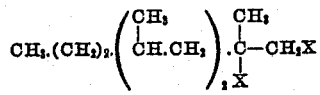

in which one X is hydrogen and the other is the carbinol radical.

References Cited in the file of this patent
UNITED STATES PATENTS

| | | |
|---|---|---|
| 2,028,091 | Jaeger | Jan. 14, 1936 |
| 2,609,397 | Gresham et al. | Sept. 2, 1952 |
| 2,675,320 | Christopher et al. | Apr. 13, 1954 |

UNITED STATES PATENT OFFICE

CERTIFICATE OF CORRECTION

Patent No. 2,887,504                                              May 19, 1959

Joseph J. Carnes et al.

It is hereby certified that error appears in the printed specification of the above numbered patent requiring correction and that the said Letters Patent should read as corrected below.

Column 3, line 30, strike out the paragraphs beginning with "In non-polar solvents," and ending with "than five minutes.", in line 64, same column, and insert the same in column 4, after the table, and before the paragraph beginning with "The alkali metal" in line 26, same column.

Signed and sealed this 22nd day of September 1959.

(SEAL)
Attest:

KARL H. AXLINE
Attesting Officer

ROBERT C. WATSON
Commissioner of Patents